A. L. JOHNSON.
PROCESS OF ELECTRIC WELDING.
APPLICATION FILED APR. 4, 1912.

1,039,137.

Patented Sept. 24, 1912.

Witnesses:
Edgar F. Farmer
G. A. Pennington

Inventor:
Albert L. Johnson
By Carter & Carter
his Attys.

UNITED STATES PATENT OFFICE.

ALBERT L. JOHNSON, OF HAMBURG, NEW YORK.

PROCESS OF ELECTRIC WELDING.

1,039,136.

Specification of Letters Patent. Patented Sept. 24, 1912.

Application filed April 4, 1912. Serial No. 688,564.

*To all whom it may concern:*

Be it known that I, ALBERT L. JOHNSON, a citizen of the United States, and a resident of the town of Hamburg, county of Erie, and State of New York, have invented a new and useful Process of Electric Welding, of which the following is a specification.

My invention relates to the welding together of two or more metal members by means of an electric current; and has for its principal objects to provide for the instantaneous welding of such members without any previous treatment thereof, to provide for the welding together of members of different thicknesses, to provide for the proper spacing of the members when the welding operation is completed, to provide for a wide spread of the welding joint, to effect economies hereinafter mentioned, and to attain various advantages.

The invention consists principally in the use of metal buttons or inserts, interposed between the members to be welded together, as hereinafter set forth.

Figure 1:
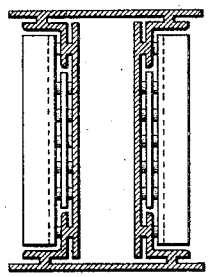
Figure 2:
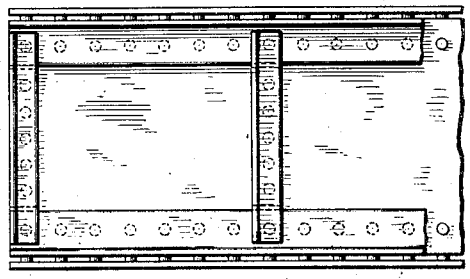
Figure 3:
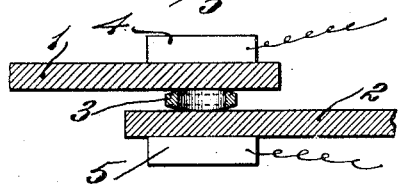
Figure 5:
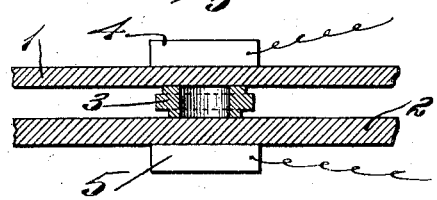
Figure 4:
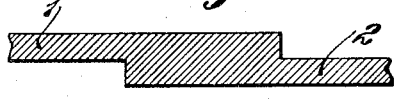
Figure 6:
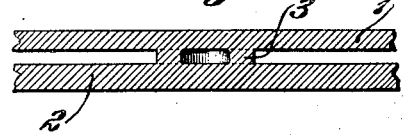
Figure 7:
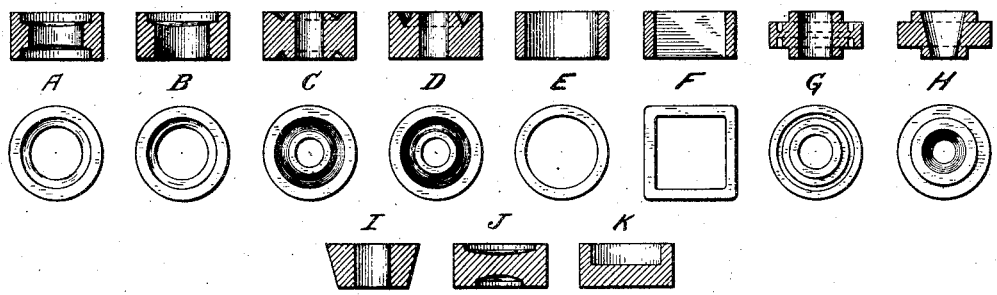
Figure 7:
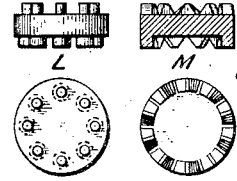

In the accompanying drawing, which forms part of this specification, and wherein like symbols refer to like parts wherever they occur, Figure 1 is a cross section of a girder built up of members welded together according to my process; Fig. 2 is a side view of the end portion of such a girder; Fig. 3 is a detail sectional view of two metal members with a metal insert interposed between them preparatory to the welding of said elements together; Fig. 4 is a detail view in section showing said metal members and insert welded together; Fig. 5 is a detail sectional view illustrating an insert interposed between two metal elements of different thicknesses preparatory to the welding thereof; Fig. 6 is a detail sectional view thereof after the welding; and Fig. 7 illustrates various forms of metal inserts showing a sectional view thereof and also an end view thereof.

Between the metal members 1 and 2, which are to be welded together, is interposed a metal button or insert 3, said insert being positioned at the point where it is desired to weld the two members 1 and 2. The two members are then pressed toward each other and the electric current simultaneously applied by means of electrodes 4 and 5 in contact with the respective elements. The pressure may be effected by special mechanical appliances; but, in shop practice, it is preferable to mount the electrodes on rollers and effect the pressure thereby, the electrodes bearing against the outer surfaces of the respective members preferably in substantial alinement with the interposed button or insert. However, as the electric current will pass through the insert regardless of the points of application of the electrodes, it is not essential that the electrodes should be in alinement with the insert; and this fact widens the field of utility of the process. For instance, it enables the process to be used in securing the metal members of the framework of a building while the work is in progress. In such case, the cross sectional area of the metal building element is so large that the increase of electrical resistance by reason of the electrode being applied at a distance from the metal insert is of little significance; but in the case of thin metal elements, such increase of resistance involves waste of current and possible injury of the element.

As indicated in the drawing, the area of the electrodes in contact with the members to be welded is preferably considerably larger than the area in contact with the button or insert. In consequence of the arrangement and conditions above stated, the electric current is localized on the insert and the portions of the members 1 and 2 in contact with said insert or immediately adjacent thereto. The current thus localized almost instantaneously melts or softens the insert and adjacent portions of the members 1 and 2 so as to effectively weld them together.

As the button or insert is softened by the welding current, the pressure tends to force the two members 1 and 2 toward each other. Frequently it is desirable that the members 1 and 2 of the finished product should be spaced a predetermined distance apart; and my invention is especially advantageous in achieving this result. For this purpose, the insert is especially designed so that, in addition to its function as a welding element by the melting of a greater or smaller portion thereof, it shall also serve to space the members apart, which function implies a certain degree of solidity. One design of insert which harmonizes apparently conflicting requirements is illustrated in Fig. 5. In this design the button or insert may be considered as a disk with projecting shoulders on its opposite faces. The shoulders being of smaller area than the cross sectional area of the middle or disk portion of the button or insert. In service these shoulders are in contact with the members to be welded and the heat effects are concentrated on them. On account of the disk being of greater area than the shoulders, its electrical resistance is less, and the portion of the disk out of alinement with the shoulders will remain comparatively cool during the very short interval required for the welding operation; and consequently this comparatively cool portion will serve to limit the movement of the main members 1 and 2 and thus fix the permanent spacing thereof. The shape of the button or insert may be variously modified with a view to its service as a spacing member and divers forms are shown in Fig. 7. The portion of the button or insert not in the direct path of the current tends to protect the button or insert from the effects of too great concentration of the current.

The invention is especially advantageous for the instantaneous welding together of plates of different thicknesses. Other processes for such welding are either slow or liable to seriously impair the thinner plate in heating the thicker one to the welding temperature, or are open to both of these objections, and in some cases the welding cannot be done at all without previous preparation of the material. According to my invention, the metal button or insert is formed so that its area of contact with the thinner plate is larger than that with the thicker plate. The cone shaped button illustrated at I in Fig. 7 sufficiently illustrates this feature of the invention. By the use of such a cone shaped button or insert, the electric current, and consequently the heat effect thereof, are spread over a larger contact area of the thinner plate than on the thicker plate. It would be desirable to so proportion the heated areas with reference to the other factors that the temperatures of the two plates at the point of contact with the insert should always be the same; but as the pressure on the insert while soft modifies the contact area, it is impracticable to adhere to mechanical nicety of design. Broadly speaking, the area of the portion of the thinner plate in contact with the insert should be larger than the like area of the thicker plate in inverse proportion to their thicknesses.

In most of the designs illustrated in Fig. 7, the insert has a bore extending entirely through it; but in other designs, one or both sides of the insert are hollowed out leaving an intermediate partition which will function as a spacing member. In the design illustrated at L in Fig. 7 the contact faces of the insert are provided with projecting knobs or lugs spaced apart to secure the desired spread of the welding joint; and preferably the number and size of its knobs is such as to aggregate areas desired. All of these designs have the advantage of securing a wide spreading joint for the comparatively cross sectional area of material. Among the advantages of this wide spreading joint are an increase of rigidity and a larger area for the engagement of coöperating parts.

Among the principal advantages of my invention is its adaptability for joining members of different thicknesses, as above specified. Another important advantage is that the members to be welded require no preliminary treatment of any kind and consequently composite building structures of various types may be built up thereby out of ordinary commercial shapes. In comparison with the ordinary riveting process, wherein the members are weakened by the removal of a portion of their metal, my process utilizes the full cross section of the ordinary commercial shapes used for members of the built up structure; in fact, the original cross section may be increased by the metal of the button. As the welding current is applied only where it is needed and as the inserts are easily positioned wherever they are wanted, the process is quite economical and very rapid. Another very important advantage of the process is that the wide range of variation in the design of the insert gives the designer the greatest latitude in the building up of composite structures. This is especially true by reason of the facts that the welding may be effected at points which would be inaccessible for riveting, and that an intermediate sheet or member may be welded to two other members on its opposite sides simultaneously. While I have shown the elements or members of the finished structure as spaced apart a slight distance, it is obvious that they may be pressed into contact with each other.

Obviously, the form of button or insert and the various constructions hereinbefore mentioned admit of many variations without departing from my invention.

What I claim is:

1. The process of joining metal elements which comprises the interposing of a metal insert between them and electrically welding the parts together simultaneously, the aggregate area of the contact portion of one face of the insert being less than the area inclosed in the contour of said face.

2. The process of joining metal elements which comprises the interposing of a metal insert between them and electrically welding the parts together simultaneously, the portion of the insert in contact with one of the elements being hollow.

3. The process of joining metal elements which comprises the interposing between them of a metal insert and electrically welding the parts together simultaneously, the insert having an open bore.

4. The process of joining metal elements which comprises the interposing of a tubular metal insert between them, and applying an electrical welding current by means of electrodes in contact with the outer surface of said elements in substantial alinement with said insert.

5. The process of joining metal elements which comprises the interposing of a tubular metal insert between them and electrically welding the parts together under pressure by means of electrodes in contact with the outer surfaces of said elements in substantial alinement with said insert.

6. The process of joining metal elements so that in the resulting product they will be spaced a predetermined distance apart, which process consists in interposing a metal insert between said elements, adjusting said elements and insert in desired relative position, pressing said elements against said insert, and welding the parts together by an electric current applied to said elements, said insert being of such shape that a portion thereof will remain firm during the welding operation and thereby serve to space said elements, and one face of the insert having a contact area less than the area of the contour of said face.

7. The process of electrically welding elements of different thicknesses which comprises the interposing of a metal insert between said elements at the point of welding, and then pressing the electrodes of the welding current against the outer surfaces of said elements, the insert being of such shape that the area of the portion thereof in contact with the thinner element is larger than the area of the portion of said insert in contact with the thicker element, and one contact face of the insert having a contact area less than the area of the contour of said face.

8. The process of electrically welding elements of different thicknesses which comprises the interposing of a metal insert between said elements at the point of welding, and then pressing the electrodes of the welding current against the outer surfaces of said elements substantially in alinement with said insert, the insert being of such shape that the area of the portion thereof in contact with the thinner element is larger than the area of the portion of said insert in contact with the thicker element, and one contact face of the insert having a contact area less than the area of the contour of said face.

9. The process of electrically welding elements of different thicknesses which comprises the interposing of a metal insert between said elements at the point of welding, and then pressing the electrodes of the welding current against the outer surfaces of said elements, the portion of the insert in contact with the thicker element being of smaller area than the cross-sectional area of the middle portion of said insert, and one contact face of the insert having a contact area less than the area of the contour of said face.

10. The process of joining metal elements which comprises the interposing of a metal insert between them and electrically welding the parts together simultaneously, the portion of the insert in contact with one of the elements being annular.

Signed at Buffalo, New York, this 2nd day of April, 1912.

ALBERT L. JOHNSON.

Witnesses:
ARTHUR P. CLARK,
G. E. MALONEY.